Figure 1:
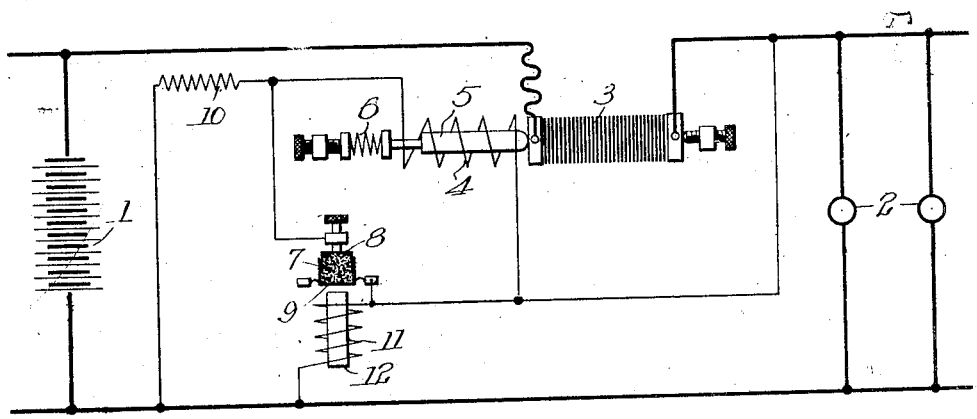

E. B. H. TOWER, Jr.
AUTOMATIC ELECTRIC REGULATOR.
APPLICATION FILED APR. 10, 1912.

Patented Sept. 28, 1915.

E. B. H. TOWER, Jr.
AUTOMATIC ELECTRIC REGULATOR.
APPLICATION FILED APR. 10, 1912.

1,154,945.

Patented Sept. 28, 1915.
2 SHEETS—SHEET 2.

Witnesses:
Robert N. Weir

Inventor
Edwin B. H. Tower Jr.

UNITED STATES PATENT OFFICE.

EDWIN B. H. TOWER, JR., OF MILWAUKEE, WISCONSIN, ASSIGNOR, BY MESNE ASSIGNMENTS, TO THE UNITED STATES LIGHT AND HEATING COMPANY, A CORPORATION OF MAINE.

AUTOMATIC ELECTRIC REGULATOR.

1,154,945.     Specification of Letters Patent.     Patented Sept. 28, 1915.

Application filed April 10, 1912. Serial No. 689,905.

*To all whom it may concern:*

Be it known that I, EDWIN B. H. TOWER, Jr., a citizen of the United States, residing at Milwaukee, in the county of Milwaukee and State of Wisconsin, have invented new and useful Improvements in Automatic Electric Regulators, of which the following is a full, clear, concise, and exact description, reference being had to the accompanying drawing, forming a part of this specification.

My invention relates to automatic electric regulators.

One of the objects of the invention is to provide a regulator which will be sensitive and stable in operation and which will regulate within close limits.

Another object is to provide a regulator with a highly sensitive variable pressure resistance or relay.

Other objects will be apparent from the description hereinafter given.

Various forms of regulators may be devised which embody the principles of my invention. For the purpose of illustration I have shown in the accompanying drawings several of such embodiments.

The views in the drawings are all diagrammatic.

Figure 2:
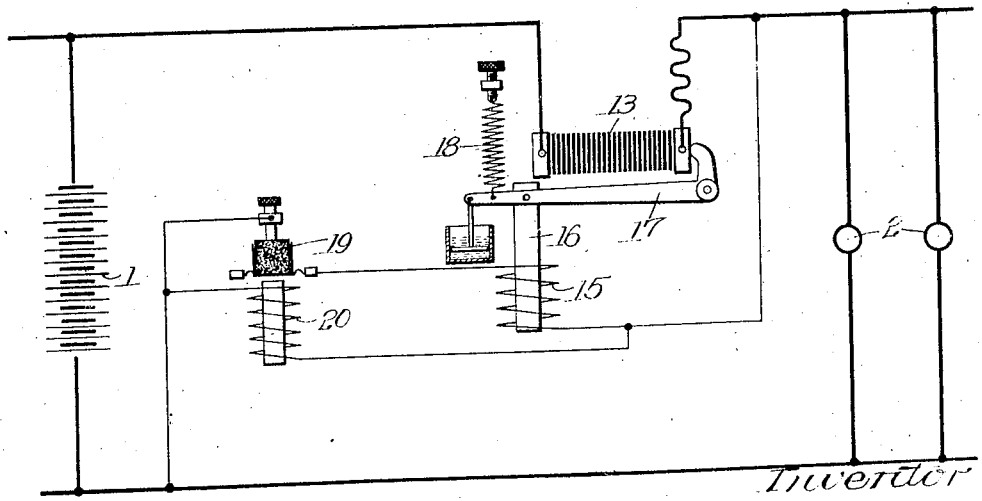
Figure 3:
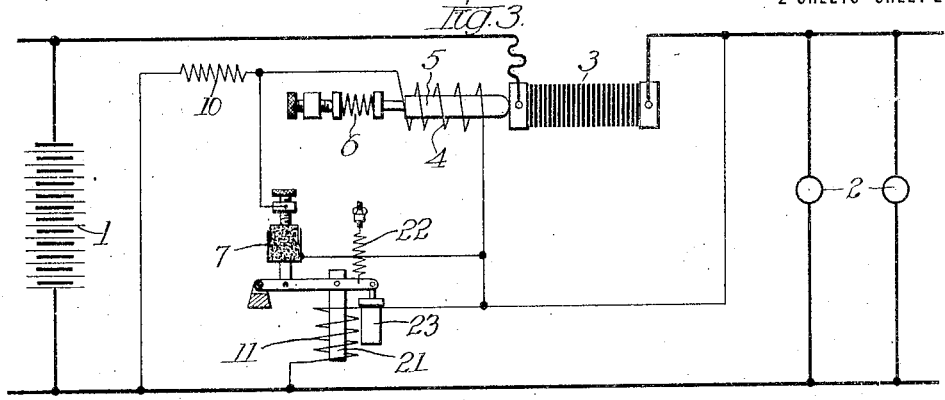
Figure 4:
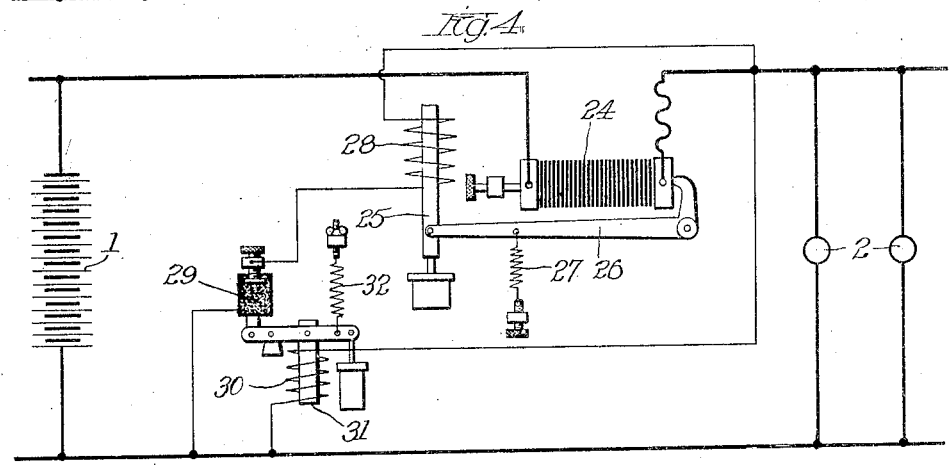
Figure 5:
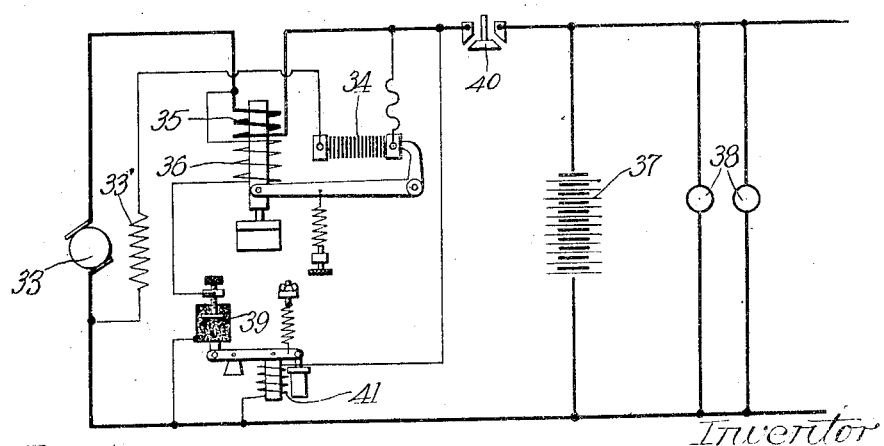

Figure 1 illustrates one form of regulator employed to regulate the voltage impressed on a translation circuit and having the relay connected in a shunt circuit around the controlling winding. Fig. 2 illustrates another form of regulator in which the relay is connected in series with the controlling winding. Figs. 3 and 4 illustrate further forms of regulators employed to regulate the voltage impressed on a translation circuit. Fig. 5 illustrates an additional form of regulator employed as a generator regulator.

In Fig. 1, a storage battery 1 is adapted to supply current to the lamps 2 or other translating devices. The storage battery may be charged from any suitable source of current. For example, it may be charged by a car lighting generator, in which case the generator, under certain circumstances, supplies current both for the battery and for the lamps, and at times tends to impress an excessive voltage on the lamp circuit. For the purpose of confining the voltage within predetermined limits, a regulating medium, such, for example, as a variable pressure rheostat 3, is connected in series with the lamp circuit. This variable pressure rheostat consists preferably of contacting resistance plates secured between suitable abutments, the resistance of the series of plates varying with the pressure with which these plates are pressed together. The pressure on the plates, and therefore the resistance, is controlled by the controlling winding 4 which, when energized, acts on the core 5 to release the pressure thereon in opposition to the action of the spring 6 which normally tends to press said plates together. It is apparent that when the winding 4 is deënergized, the resistance 3 is a minimum, due to the action of the spring. The winding 4 may be energized from any suitable source of current. In the present instance it is connected across the mains.

In order to vary the energization of the controlling winding 4, a shunt circuit is provided around said winding, whereby current may be diverted therefrom to a greater or less extent, depending on the resistance of said shunt circuit. The resistance of the shunt circuit is varied by the variable pressure resistance 7, consisting preferably of a receptacle for carbon granules or other suitable material adapted to vary its resistance in response to variations in the pressure applied to the mass of material. The receptacle illustrated consists preferably of a relatively fixed, but adjustable, conducting cap or top 8 and a body portion or base 9, mounted as part of a flexible diaphragm and adapted to be moved up and down to vary the pressure on the granular material confined between said base and cap. Various other forms of receptacles may, of course, be employed. The resistance 10 is preferably connected in circuit in series with both of the branch circuits in which the winding 4 and the resistance 7 are connected in order to prevent short circuiting of the mains.

The resistance 7 is controlled by the regulating winding 11, which is connected across the mains between the variable pressure rheostat 3 and the lamps 2 and is responsive to the voltage impressed on said lamps. The regulating winding 11 is provided with a magnetic core 12 mounted adjacent to the base 9, which latter is also constructed preferably of magnetic material and therefore adapted to be drawn down or released in response to the varying energization of the regulating winding 11.

The parts are preferably so arranged and adjusted that the resistance 3 and the resistance 7 are normally a minimum whereby the normal voltage may be impressed on the lamp circuit and whereby the greater part of the current flowing through the parallel branches in which the controlling winding 4 and the resistance 7 are included, is deflected around, or away from, said controlling winding.

Whenever the voltage impressed on the lamp circuit tends to exceed a certain predetermined value, the increased energization of the regulating winding 11 causes the base or diaphragm 9 to be attracted or drawn down, thereby increasing the resistance 7, whereby less current traverses the shunt path around the winding 4, thereby increasing the energization of said winding and relieving somewhat the pressure applied to the series of resistance plates of rheostat 3. The decrease in said pressure causes an increased resistance in the lamp circuit whereby the voltage impressed on said circuit tends to drop to the desired value. It will be apparent that a very slight movement of the flexible diaphragm is sufficient to cause a decided variation in the resistance of the granular material. Accordingly, the regulator is very sensitive and regulates within close limits. The movement, however, is sufficient to keep the granules agitated and thereby prevent packing and glazing.

In the form of regulator illustrated in Fig. 2, the resistance of the variable pressure rheostat 13 is normally a minimum due to the energization of the controlling winding 15 acting on the core 16 and a bell crank lever 17 to normally hold these parts in lowermost position against the action of the spring 18 which tends to raise them. The granular resistance 19 is normally a minimum value, whereby maximum energization of the controlling winding 15 is permitted. Upon increasing tendency of the voltage to rise, the increased energization of the regulating winding 20 causes an increase in the value of the resistance 19, thereby decreasing the energization of the controlling winding 15 connected in series therewith, whereby the spring 18 is permitted to raise the core and move the bell crank lever to release the pressure and thereby increase the resistance of the variable pressure rheostat 13, whereby the voltage of the lamp circuit is confined within predetermined limits.

The circuit connections in Fig. 3 are substantially the same as those described in connection with Fig. 1, the regulating winding 11 acting, when energized, to draw down its core 21 against the action of the spring 22 which normally maintains the same in elevated position, thereby maintaining the granular resistance 7 at a minimum value. The dash pot 23 steadies the action of the movable parts. The general operation of this regulator is substantially the same as the regulator described in Fig. 1, whereby the voltage tending to be impressed on the lamp circuit is maintained within predetermined limits.

In the form of regulator shown in Fig. 4, the resistance of the variable pressure rheostat 24 is normally a minimum, due to the weight of the core 25 and of the bell crank lever 26, assisted by the spring 27. The energization of the controlling winding 28 is normally a minimum as the resistance 29 in series therewith is normally a maximum. Upon increase in voltage above a predetermined value, the energization of the regulating winding 30 increases, whereupon the core 31 is drawn down against the action of the spring 32, to decrease the resistance 29 and increase the energization of the controlling winding 28. The core 25 accordingly is lifted and the pressure on the resistance plates 24 is diminished, whereupon the resistance in the lamp circuit is increased to cause the voltage impressed thereon to drop.

In Fig. 5 a car lighting system is illustrated, in which the regulator is arranged to control the generator field circuit and thereby control the generator output. The generator is shunt wound and has the usual armature 33 and field winding 33'. The variable pressure rheostat 34 is connected in series with the field winding 33'. Variations in the resistance 34 produce corresponding variations in the generator field strength, whereby the generator may be regulated for constant current or constant voltage, depending on whether or not the variable pressure rheostat 34 is controlled by a series or shunt winding. In the present case both a series winding 35 and a shunt winding 36 are provided. The series winding is connected in the external circuit of the generator, across which circuit the storage battery 37 and the lamps 38 are connected in parallel branches. The generator is normally regulated for constant current output by this series coil 35, the shunt coil 36 being normally energized only very slightly, owing to the fact that the granular resistance 39, which is connected in series therewith, is normally a maximum. If the generator current output tends to exceed a predetermined value, the energization of the series winding 35 causes a decrease in the pressure applied to the variable pressure rheostat, whereby the resistance included in the generator field circuit is increased, and the generator current accordingly decreased. When the generator current tends to drop below a certain value, a reverse operation takes place. When the generator is delivering current at the normal rate, it charges the storage battery and also carries the lamp load, the automatic switch 40 being closed, of course. Under these conditions, when the battery approaches a fully charged condition, the increased counter electro-motive force developed thereby causes a rise in the voltage of the system, whereupon the regulating winding 41 responds to the increasing voltage and acts to decrease the granular resistance 39, whereby more current is permitted to flow through the shunt coil 36 connected in series with said resistance. As a result the generator field resistance is increased and the current delivered by the generator is reduced, whereby the battery charging current is also reduced. The operation above described prevents overcharging of the battery.

From the foregoing description it will be apparent that the invention is not limited to the particular embodiments thereof illustrated and described, as these embodiments were selected simply for the purpose of illustrating some of the advantageous ways in which the main features of the invention might be employed. I desire, therefore, to cover broadly any suitable equivalent means for accomplishing the desired results and falling within the scope of the appended claims.

What I claim as my invention and desire to secure by Letters Patent of the United States is:

1. Regulating means for an electric circuit provided with an operating electro-magnet for controlling said regulating means, and means for controlling the energization of said electro-magnet, said last mentioned means including a container for a granular resistance material, granular resistance material normally compressed in said container, and means responsive to electrical conditions in the circuit to be controlled for increasing or decreasing the compression on said granular resistance material upon slight variations in said electrical conditions, whereby said regulator will be caused to respond to minute variations in the circuit to be controlled.

2. An electromagnetically operated carbon disk rheostat and means for increasing the sensitiveness thereof, said means including a mass of finely divided carbon normally under pressure, connected in a shunt circuit around the operating electro-magnetic winding for said rheostat, and means for releasing the pressure on said mass by minute increments, whereby the energization of said winding may be varied in response to infinitesimal movements of said pressure releasing means.

3. A regulator comprising a regulating medium, a controlling winding for varying the same, a granular resistance device connected in a shunt circuit around said winding to divert current therefrom, said device consisting of a receptacle having as one wall thereof, a flexible diaphragm of magnetic material and means for moving said diaphragm to vary said granular resistance, and to agitate the granules.

4. In a car lighting system, a regulator including a series of carbon blocks adapted to be connected in series in the circuit to be regulated, operating means for varying the pressure exerted on said blocks, said means including an electromagnetic winding and means for increasing the sensitiveness of said regulator, said means including a mass of finely divided carbon normally under pressure connected in a shunt circuit around the operating electro-magnetic winding for said regulator, and means for releasing the pressure on said mass by minute increments, whereby the energization of said winding may be varied in response to infinitesimal movements of said pressure-releasing means.

In witness whereof, I have hereunto subscribed my name in the presence of two witnesses.

EDWIN B. H. TOWER, Jr.

Witnesses:
E. R. KING,
GEO. B. JONES.

Copies of this patent may be obtained for five cents each, by addressing the "Commissioner of Patents, Washington, D. C."